United States Patent
Fitzgibbons et al.

(10) Patent No.: US 6,739,510 B2
(45) Date of Patent: May 25, 2004

(54) OCR/BCR SEQUENCING PRIORITY

(75) Inventors: Patrick J. Fitzgibbons, Newark Valley, NY (US); Bruce H. Hanson, Endicott, NY (US); William J. Woods, Johnson City, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 133 days.

(21) Appl. No.: 10/092,778

(22) Filed: Mar. 8, 2002

(65) Prior Publication Data
US 2003/0168513 A1 Sep. 11, 2003

(51) Int. Cl.[7] .............................................. G06K 17/00
(52) U.S. Cl. .................. 235/462.01; 382/101; 209/584
(58) Field of Search ........................... 235/462.01, 375, 235/376, 454; 382/101, 103, 309; 209/584, 900; 700/213, 224, 225, 226

(56) References Cited

U.S. PATENT DOCUMENTS

| | | | |
|---|---|---|---|
| 4,408,344 A | * 10/1983 | McWaters et al. | 382/318 |
| 4,538,072 A | * 8/1985 | Immler et al. | 250/568 |
| 4,542,528 A | * 9/1985 | Sanner et al. | 382/318 |
| 5,518,122 A | 5/1996 | Tilles et al. | 209/539 |
| 5,581,064 A | 12/1996 | Riley et al. | 235/383 |
| 5,770,841 A | * 6/1998 | Moed et al. | 235/375 |
| 5,862,243 A | 1/1999 | Baker et al. | 382/101 |
| 5,974,147 A | 10/1999 | Cordery et al. | 705/62 |
| 6,058,190 A | 5/2000 | Cordery et al. | 380/51 |
| 6,366,696 B1 | * 4/2002 | Hertz et al. | 382/183 |

FOREIGN PATENT DOCUMENTS

JP          06103400 A   *   4/1994   ............ G06K/7/10

* cited by examiner

Primary Examiner—Diane I. Lee
(74) Attorney, Agent, or Firm—Whitham, Curtis & Christofferson, P.C.

(57) ABSTRACT

A rejection rate of a selective sequential processing apparatus such as a mail sortation apparatus is reduced by combining results of at least two feature discrimination arrangements such as optical character recognition and a bar code reader based on comparisons of results of the feature discrimination results against each other and against expected values to validate at least one result and rejecting articles for manual processing only when no feature discrimination result can be validated. The results of one feature discrimination technique can be used to augment results of another feature discrimination technique to improve selective processing accuracy and processing speed and throughput are increased by allowing use of faster or accelerated feature discrimination processes while maintaining a greater number of articles within the automated process.

20 Claims, 2 Drawing Sheets

OCR/BCR SEQUENCING PRIORITY

BACKGROUND OF THE INVENTION

1. Field of the Invention

The present invention generally relates to deriving information regarding articles from indicia thereon or characteristics thereof such as may be used for sortation and other selective processes and, more particularly, to deriving information from a plurality of potentially inconsistent indicia or characteristics particularly for sorting articles for transport to various locations based on machine readable indicia.

2. Description of the Prior Art

Many commercial applications require different actions to be taken or processes to be performed on different articles which may be sequentially processed. In many such cases, the selection of the process or action is based upon characteristics of the articles themselves such as properties that may be determined through testing or inspection, as in the manufacture of electronic devices that may be differentiated by electrical properties or tolerances or, more often, by identification of some particular physical characteristic of each article, for example, sorting of mail for transportation to one of a large number of potential destinations based on the address information affixed thereto.

Sorting of mail is a particularly high-volume process which, as a practical matter, must be highly automated. In order to automate such a high-volume process, it is necessary to also automate the reading or distinguishing of addresses. Accordingly, optical character recognition (OCR) processes have been developed and have reached a relatively high level of sophistication in order to accommodate hand-written indicia as well as many different fonts of many different or even varying sizes. However, optical character recognition remains subject to errors and the data processing overhead is relatively large and the execution thereof correspondingly slow.

Therefore, it is common at the present time to provide additional markings such as bar codes or other machine readable indicia on articles to allow more rapid and more accurate reading to be performed. The reading of such indicia, of any type that particularly facilitates reading by machine (whether or not to the exclusion of being readily human-readable, as in the case of bar codes) will be collectively referred to hereinafter by the currently preferred apparatus for performing the function, called a bar code reader (BCR).

However, the amount of information which can be encoded in a bar code or similar machine-readable indicia may often be severely limited. For example, The familiar "Zip-code" is often used as a five-digit number; three digits of which are sufficient to specify a routing through a particular processing and distribution center (P&DC) while five digits identifies a particular post office facility (from a plurality thereof serviced by a single P&DC). In recent years, nine digit "Zip-codes" have been adopted and are increasingly used which are sufficient to specify a particular carrier route for delivery. However, it is desirable to provide an eleven bit code to allow sorting to delivery order of specific delivery locations within a given carrier route. Therefore, "Zip-codes" will most often appear in a five or nine digit form while bar codes may be applied in a three, five, nine or eleven digit form and it is most likely that even if the nine digit form of "Zip-code" is used and read to generate a bar code, a portion of the remainder of the address must be read to supply an additional two digits in order to support the desired sorting processes.

Further, such bar code or machine-readable indicia are subject to numerous sources of error such as being performed in response to a possibly erroneous optical character recognition process or incorrect bar codes being applied by a sender which do not correspond to the written address. Moreover, bar code or machine readable indicia may not be applied to all articles subjected to the automated process and the OCR processing cannot be omitted completely. At best, BCR processes can be used to supplement OCR processes and possibly reduce the average amount of time for data acquisition to control a selective process. BCR processes clearly cannot perform or be regarded as an alternative for OCR processes at the present time.

Unfortunately, while some gains in processing time may be achieved by using OCR and BCR processes together, both OCR and BCR processes represent largely independent but sometimes related sources of error. The basic effect of these increased number of sources of error is an increased number of articles that are rejected from the selective (e.g. sorting) process which is greater than the sum of the numbers of articles which would be independently rejected from the OCR and BCR processes, respectively. For example, rejection rates currently experienced for mixed mail (where bar codes may not appear on a significant percentage of articles) are about 40% representing rejection rate components of about 30% from OCR processes performed at the required rates on objects moving at required speeds and at realistic variation in location of written or printed addresses because the OCR results are in error (e.g. do not correspond to a real address) or the address cannot be read under the necessary conditions, about 2% from BCR processes where possible (since bar codes may not appear on all articles) and about 8% due to disagreement between OCR and BCR results.

The rejection rate greater than the sum of the OCR and BCR rejection rates can be understood from the fact that inconsistency between the OCR and BCR results also cause rejection of the article. At the present state of the art, the number of articles rejected under a combination of OCR and BCR processes in the exemplary mail sortation environment alluded to above is a severe limitation to the volume of articles that can be processed by a given sorting apparatus within an acceptable amount of time since the rejected articles must be manually sorted within the same overall time frame, particularly when the automated process can only be effectively applied to less than two-thirds of the articles. Even if the rejection rates were significantly lower, human intervention is typically required for each rejected article and the number of articles which can be manually processed by one person in a given amount of time is generally far lower than the article rejection rate currently being experienced using a combination of OCR and BCR processes. It is a significant indicator of the cost and time consumed by manual sorting and the value of decreasing rejection rates that very expensive, large and complex sorting machines are well-justified and cost effective even though capable of automating only slightly more than half of the manual sorting process.

SUMMARY OF THE INVENTION

It is therefore an object of the present invention to provide a technique of combining OCR and BCR processes in a way that reduces rejection rates to much lower levels than previously possible.

It is another object of the invention to provide a selective control or sortation apparatus having reduced rejection rate and correspondingly increased throughput.

In order to accomplish these and other objects of the invention, a method of combining results of a plurality of feature discriminating techniques applied to an article and a sequential selective processing apparatus employing the same are provided wherein the method includes steps of validating either a result of a first feature discrimination technique or a result of a second discrimination technique when the results of the respective feature discrimination techniques correspond to each other, validating or rejecting a result of the first feature discrimination technique against expected or permitted values, validating or rejecting a result of the second feature discrimination technique against expected or permitted values, and outputting a validated result for control of a sequential selective process while rejecting only articles where neither of the results of the first or second feature description techniques is validated.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
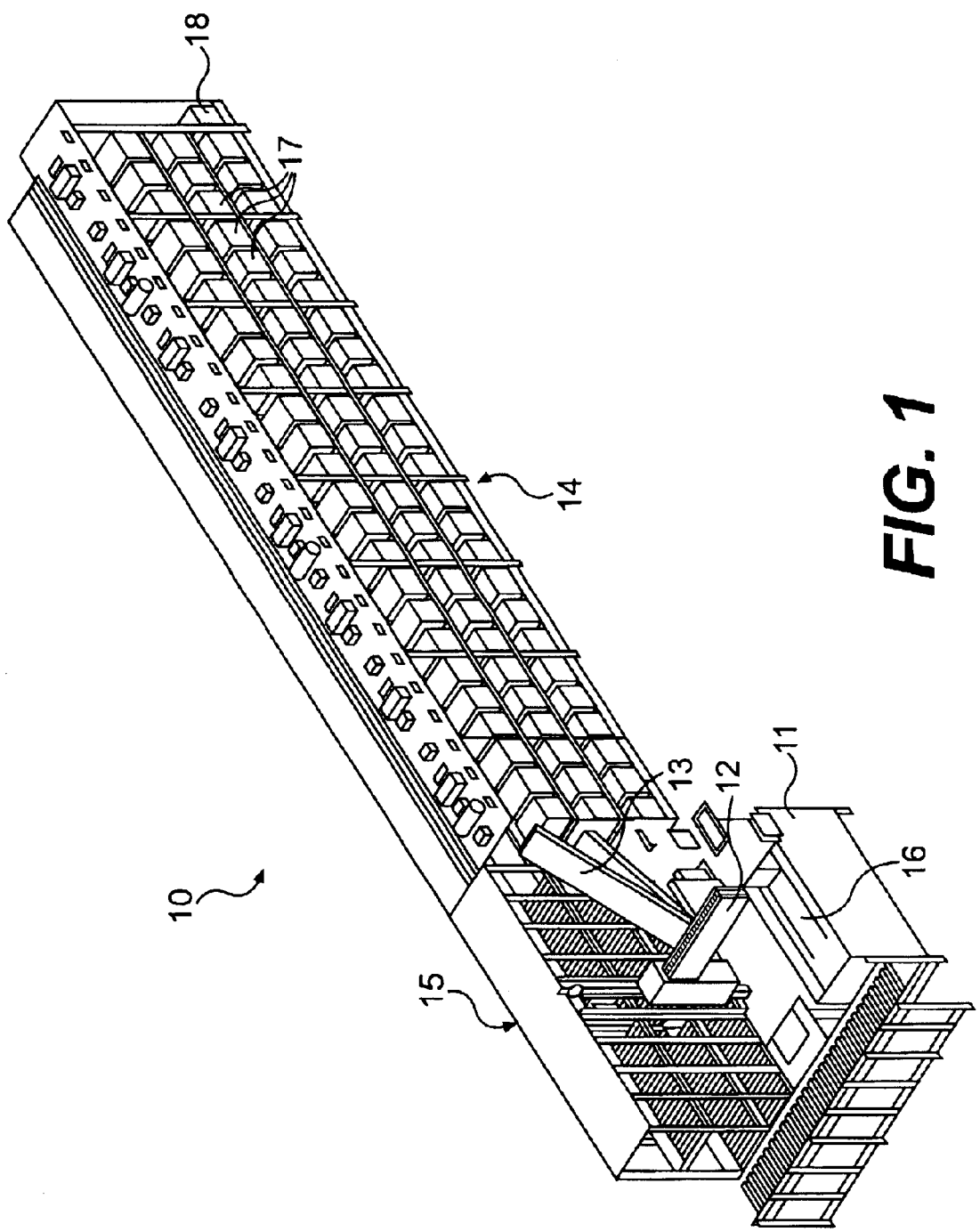
FIG. 1 is a perspective view of a sorting apparatus in which the OCR/BCR combination in accordance with the invention may be advantageously employed.

Referring now to the drawings, and more particularly to FIG. 1, there is shown an exemplary mail sortation apparatus 10 as disclosed in U.S. Pat. No. 6,316,741, issued Nov. 13, 2001, and assigned to the assignee of the present invention and which is hereby fully incorporated by reference. It is to be understood that the apparatus of FIG. 1 is particularly adapted for sorting of flats or envelopes and other devices may be used depending on the type and/or characteristics of the articles being handled and sequenced therethrough to which the methodology of the invention is equally applicable. It is further to be understood that the methodology of the invention may be advantageously employed in the apparatus of FIG. 1 or any other sequential processing arrangement or adaptation for other types of articles to increase overall capacity, accuracy and functionality thereof and, to the extent the invention may be embodied therein, no portion of FIG. 1 is admitted to be prior art as to the present invention.

(Moreover, while the invention will be described in connection with the preferred application to mail sorting where the detected distinguishing characteristic of the article is the delivery destination applied thereto, the applicability of the invention is not so limited and can readily be applied to any sequential selective processing arrangement. Also, since many automated testing and/or inspection procedures are performed optically at the present time and often share numerous characteristics and techniques with OCR processes such as template matching it is to be understood that the term "OCR" or "optical character recognition" is intended to be a collective reference to and inclusive of any and all such testing and inspection techniques capable of detecting distinguishing features of interest that are characteristic of the articles as distinguished from principally machine readable indicia that may be affixed thereto.)

The apparatus 10 of FIG. 1, as more fully described in the above-referenced U.S. patent is arranged in five distinct sections: a feeder section 11, a reorientation section 12, an incline section 13, a main transport 14 and a return conveyor 15; the general respective functions of which will be familiar to those skilled in the art. Reorientation section 12 receives flats from feeder section 11 and transports them past a camera which can image and digitize the address written thereon to a form suitable for optical character recognition processing. The same camera or a different device can be used to detect and read a bar code or other machine readable indicia which may or may not be placed on respective articles. The image(s) of the flat thus obtained will include a written (e.g. human readable) address and any bar codes which may be present on the flat. The image(s) will be in a digitized form which can be readily rotated electronically for recognition. A similar arrangement, with or without the remaining sections could be used to automatically apply a bar code or other machine readable indicia.

The information thus obtained from each article processed in sequence is used to control which of a plurality of bins 17 is to ultimately receive each article during the sorting operation which is preferably performed in two passes. However, as alluded to above, both the OCR and BCR processes are subject to some degree of error. The error rate may also be compounded if an OCR process is used to apply machine readable indicia such as a bar code to articles and one or more characters are incorrectly recognized.

Additionally, as alluded to above, any inconsistency between the results of the OCR and BCR processes performed during sorting in the apparatus of FIG. 1 may cause the article to be rejected from the sorting process and delivered to bin 18 for manual processing. Therefore, while the use of both OCR and BCR processes is preferred in the apparatus of FIG. 1 (insofar as both human readable and machine readable indicia are provided on a given article) in order to reduce average reading time and support high levels of throughput, the error rate observed is higher than that of the OCR and BCR processes individually as well as higher than their sum.

The methodology in accordance with the invention by which the error rate is significantly reduced and the accuracy and throughput of the apparatus of FIG. 1 increased will now be explained in accordance with FIG. 2. It should be understood that FIG. 2 may be understood as either a high level schematic diagram or a flow chart or both. The methodology is preferably embodied in software or firmware executed by a general or special purpose digital data processor included within reorientation section 12 of apparatus 10. It will be appreciated by those skilled in the art that the various steps of FIG. 2 will be performed by circuitry functionally configured in a similar fashion during initialization of the software or firmware when run.

The invention exploits the fact that some degree of sorting or at least a single OCR operation or other detection of a distinguishing characteristic (e.g. testing, inspection, feature detection and the like as alluded to above) will normally have been performed when both OCR and BCR information is available. Preferably, in a mail sorting application, the articles will have been sorted to the level of a carrier route but any level of sorting can be advantageously exploited in accordance with the basic principles of the invention. In other words, when the invention is likely to be employed, some information about the articles (collectively or individually) to be processed will have been acquired by at least one prior OCR or similar process which allows some assumptions to be made in regard to the relative reliability of data acquired from the OCR and BCR processes performed during operation of the invention and to allow optimal use thereof to reduce rejection rate.

The invention does not use either the OCR or BCR data to the exclusion of the other or require them to agree but develops a hybrid or synthesized group of combined results which supports much increased acceptance rates and many fewer rejected articles. The manner in which the OCR and BCR data is utilized or combined is variable and exploits or leverages the fact that prior processing allows the sort plan or other group of mutually distinguishing detectable features to be less than exhaustive or global (even to the extent of a global list of physically existing addresses, but does not include non-existent addresses such as non-sequential street numbers, against which OCR and BCR information can be checked). As will be discussed in greater detail below, testing of acquired OCR and BCR data against a set of data where some values are disallowed (e.g. excluded from a sort plan for a single P&DC, post office or carrier route) allows assumptions to be made as to relative reliability of data which supports an optimal choice of the manner of utilization of the OCR and BCR data and results in a reduced rejection rate.

Figure 2:
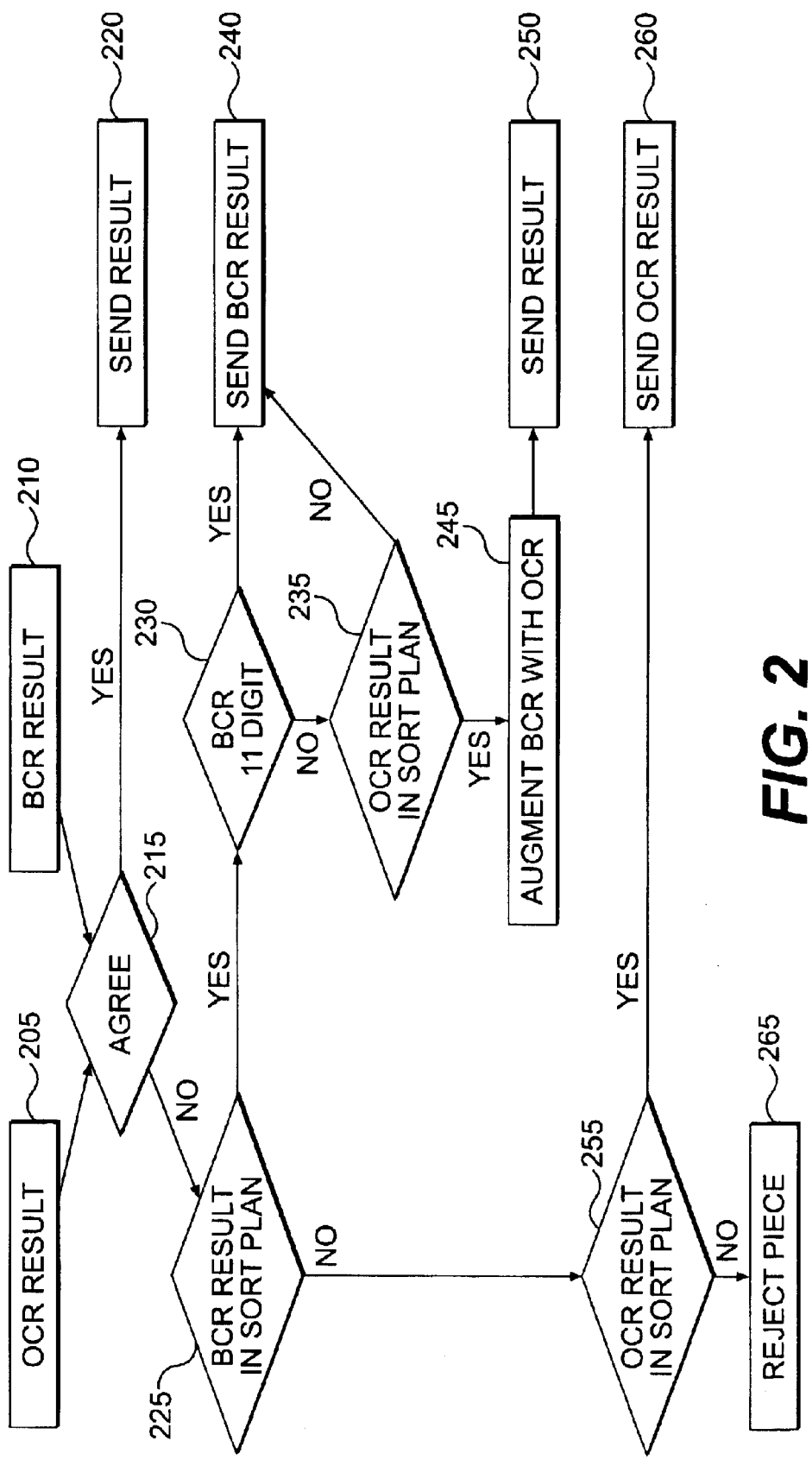
FIG. 2 is a high-level block diagram or flow chart detailing the preferred methodology of the invention.

More specifically and with reference to FIG. 2, the processing in accordance with the preferred embodiment of the invention begins with the capture of OCR data 205 (or other inspection or testing data, as discussed above) and BCR data 210 (or other data obtained from machine readable indicia, as discussed above) which are first tested against each other, as shown at 215, as can be achieved by a look-up table, digital logic possibly including fuzzy logic, content addressable memory or the like as will be apparent to those skilled in the art. While it is anticipated that the OCR and BCR data are captured in a real-time reading operation in the preferred application and embodiment of the invention, it should be appreciated that either or both of the OCR and BCR data can be obtained from any source, such as a prior reading operation, as long as the OCR and BCR data are reliably associated with an individual article. It should also be appreciated that the OCR process, while generally requiring more processing overhead and more time to execute on given hardware resources, can be accelerated in numerous ways such as allocation of greater hardware resources and/or association of the read OCR data with OCR data previously captured (as an error correction technique) in a process where more time or processing resources could be allocated thereto for the purpose of obtaining a more accurate OCR result.

If the OCR data and BCR data agree, it can be assumed that the information is correct and complete with a very high degree of confidence and can be reported as shown at 220 for selective control of processing/sorting in accordance with the invention. In this regard, it should be noted that the OCR data will provide a complete address and the information in the BCR data can be of fewer digits than the eleven digits considered to be optimal at the present time. It is only important for this particular test that the OCR and BCR data agree to the extent of information contained in the BCR data and/or, possibly, the portion that is found to be readable in the OCR data.

If the OCR and BCR data do not agree, the BCR data is tested against the sort plan (or the group of values of the BCR result which are allowed or expected, as discussed above) as shown at 225. The rationale for performing this test next in sequence is that the error rate for the BCR operation is generally much lower than the OCR error rate as noted above and, hence, may be assumed to be more reliable. However, if the value of the BCR data is not allowed or expected (e.g. included in the sort plan) it may be reliably assumed that the BCR data is, in fact, erroneous.

If the BCR data is allowed or in the sort plan, it is tested (e.g. by look-up table, logical comparison including fuzzy logic, content addressable memory or the like) to determine if it is complete, as illustrated at 230. That is, a BCR result or value can match an expected value or be confirmed as such while having fewer digits than is considered optimal (e.g. currently eleven digits for mail sorting to uniquely identify each possible delivery destination although fewer digits such as nine, five or three digits may be considered as complete, depending on the nature of the sort process to be performed). For example, a five digit BCR value can match the first five digits of one of the carrier routes in the sort plan even though nine digits are required to uniquely identify a particular carrier route. If the BCR data is complete or at least sufficient to the sort process, the BCR data (which has already been determined to be reliable at 225) may be sent and used to control the sequential selective process.

If the BCR data is not complete, the OCR data for the same article is tested against the sort plan or list of expected values, as illustrated at 235. If the OCR data is not in the sort plan, it will have been confirmed that the BCR data, although not complete, is at least the best data available and the BCR data is sent for control of the process as shown at 240, as discussed above. The sort plan options, outside the scope of this invention can then use the data to the extent possible for processing (since it may be sufficient to the sort or other processing being performed), use it as an identifier to select an input from a video coding station (VCS: a computer that can be used to manually input address data for a particular piece of mail) for direct use or to augment the BCR data in much the same manner as augmentation with the OCR data or to reject the piece in a manner which is irrelevant to the invention or the achievement of its meritorious effects. On the other hand, if the OCR data is expected or in the sort plan as determined at 235, the OCR data will at least be sufficiently complete to correspond to a complete (e.g. eleven digit) BCR value and can be used to augment the BCR data to a complete value or any desired lesser degree, as illustrated at 245 and this result can be sent to control the selective sequential process, as illustrated at 250.

At this point, it should be appreciated that the rapidly obtained and generally reliable (since error correction provisions and redundancy are generally included in reading arrangements for machine readable indicia) BCR results are verified against the OCR data and/or expected or permitted values (e.g. of the sort plan) and possibly augmented using the more complete OCR data, if consistent therewith. Even if the BCR data is not optimally complete, the data will have been confirmed as the best available and used to the fullest extent possible. This limits the overall rejection rate to no greater than that available from BCR data alone while the confidence factor in the reliability of the BCR data used is substantially enhanced. Conversely, erroneous BCR data is reliably discriminated and the rejection rate further reduced based on the OCR data, where possible, as will now be discussed.

Specifically, if the BCR data is not expected/permitted (e.g. in the sort plan) as determined at 225, discussed above, the OCR data is tested against the expected or permitted values (e.g. in the sort plan) as illustrated at 255. This process is identical to that described above and illustrated at 235 except that different actions are taken in view of the previously determined error in the BCR data. If the OCR data is a permitted or expected value, the OCR data, which is necessarily complete since it reflects the entire content of the written address indicia, is sent for control of the selective sequential processing of articles. Thus rejections from the process are limited to only those cases where neither the BCR data nor the OCR data is correct; a rejection rate which is therefore, statistically, the product of the OCR and BCR error rates and thus much smaller than either. Typical observed rejection rates achieved by the invention are in the range of only about 1% or less which may be viewed as being able to automate reading and use of data for control of selective sequential processing for 99% or better of the articles which would have been rejected from the process and required manual processing in the absence of the invention. This low rejection rate compares very favorably with the 40% rejection rate observed without the invention and effectively extends automation of the selective process to substantially all articles and substantially doubling the effectiveness of the automation while reducing the number of rejected articles requiring manual processing to levels that can easily be accommodated with few personnel in the same time frame generally required for automated processing and virtually doubling throughput.

In view of the foregoing, it is seen that the invention provides a technique of significantly reducing rejection rates in sequential selective processing arrangements by optimally combining results of a plurality of automated indicia-reading or feature detecting processes; each of which is subject to error. The rejection rate is brought to levels lower than the error rate for any of the respective indicia-reading or feature detecting processes as compared to a rejection rate greater than the sum of the respective error rates. This reduction in rejection rates significantly increases throughput of sequential selective processing arrangements and mail sorting and other high volume applications by reducing the amount of manual processing required and retaining more of the articles within the automated process.

While the invention has been described in terms of a single preferred embodiment, those skilled in the art will recognize that the invention can be practiced with modification within the spirit and scope of the appended claims.

We claim:

1. A method of combining results of a plurality of feature discriminating techniques applied to an article including steps of
   validating one of a result of a first feature discrimination technique and a result of a second discrimination technique when said results correspond to each other,
   validating or rejecting a result of said first feature discrimination technique against expected or permitted values,
   validating or rejecting a result of said second feature discrimination technique against expected or permitted values, and
   outputting a validated result for control of a sequential selective process while rejecting only articles where neither of said results is validated.

2. A method as recited in claim 1, including the further step of
   augmenting a validated result of one of said first and second feature discrimination techniques with a validated result of another of said first and second feature discrimination techniques prior to said outputting step.

3. A method as recited in claim 2, wherein one of said first and second feature discrimination techniques is optical character recognition.

4. A method as recited in claim 3, wherein one of said first and second feature discrimination techniques is reading of machine readable indicia.

5. A method as recited in claim 4, wherein said machine readable indicia is a bar code.

6. A method as recited in claim 1, wherein one of said first and second feature discrimination techniques is optical character recognition.

7. A method as recited in claim 6, wherein one of said first and second feature discrimination techniques is reading of machine readable indicia.

8. A method as recited in claim 7, wherein said machine readable indicia is a bar code.

9. A method as recited in claim 1, wherein one of said first and second feature discrimination techniques is reading of machine readable indicia.

10. A method as recited in claim 9, wherein said machine readable indicia is a bar code.

11. A selective sequential processing apparatus including
    means for validating one of a result of a first feature discrimination technique and a result of a second discrimination technique when said results correspond to each other,
    means for validating a result of said first feature discrimination technique against expected or permitted values,
    means for validating a result of said second feature discrimination technique against expected or permitted values, and
    means for outputting a validated value for control of a sequential selective process while rejecting only articles where neither of said results is validated.

12. Apparatus as recited in claim 11, further including
    means for augmenting a validated result of one of said first and second feature discrimination techniques with a validated result of another of said first and second feature discrimination techniques prior to outputting said result.

13. Apparatus as recited in claim 12, wherein one of said first and second feature discrimination techniques is optical character recognition.

14. Apparatus as recited in claim 13, wherein one of said first and second feature discrimination techniques is reading of machine readable indicia.

15. Apparatus as recited in claim 14, wherein said machine readable indicia is a bar code.

16. Apparatus as recited in claim 15, wherein said selective sequential process is sortation of articles.

17. Apparatus as recited in claim 11, wherein one of said first and second feature discrimination techniques is optical character recognition.

18. Apparatus as recited in claim 11, wherein one of said first and second feature discrimination techniques is reading of machine readable indicia.

19. Apparatus as recited in claim 18, wherein said machine readable indicia is a bar code.

20. Apparatus as recited in claim 11, wherein said selective sequential process is sortation of articles.

* * * * *